Sept. 6, 1966    E. R. PHILLIPS    3,270,759

FLUID DEVICE

Filed June 7, 1963

INVENTOR
EDWIN R. PHILLIPS

BY   *Edward M. Farrell*

ATTORNEY 3,270,759
FLUID DEVICE
Edwin R. Phillips, Westport, Conn., assignor to Sperry Rand Corporation, New York, N.Y., a corporation of Delaware
Filed June 7, 1963, Ser. No. 286,396
1 Claim. (Cl. 137—81.5)

This invention relates to multi-stable fluid devices.

Fluid devices have been used as switching, detecting and amplifying elements. In many cases, these devices have replaced electronic and mechanical components. Fluid devices in general require no moving mechanical parts. Consequently, repair or replacement of parts are minimized. Fluid devices are superior in many cases to electronic devices since the former are not subject to burn out of parts. In addition, to these advantages, fluid devices are generally insensitive to environmental conditions such as temperature, humidity and vibrations.

It is an object of this invention to provide an improved fluid switching device which permits fast switching.

It is a further object of this invention to provide an improved fluid switching device in which the overall size is minimized.

It is still a further object of this device to provide an improved fluid device which maintains a relatively high pressure ratio between two outlets.

It is still a further object of this invention to provide an improved fluid switching device in which stability is maintained with relatively heavy loads at the outlets.

It is still a further object of this invention to provide an improved fluid device of relatively high efficiency.

In accordance with the present invention, a fluid device comprises a common mixing chamber. An inlet, a plurality of inlets, a pair of outlets and a vortex chamber all lead from the mixing chamber. The vortex chamber is disposed in substantial alignment with the inlet and intermediate the pair of outlets. The vortex chamber is dimensioned to maintain the fluid flow at one of the outlets.

Figure 1:
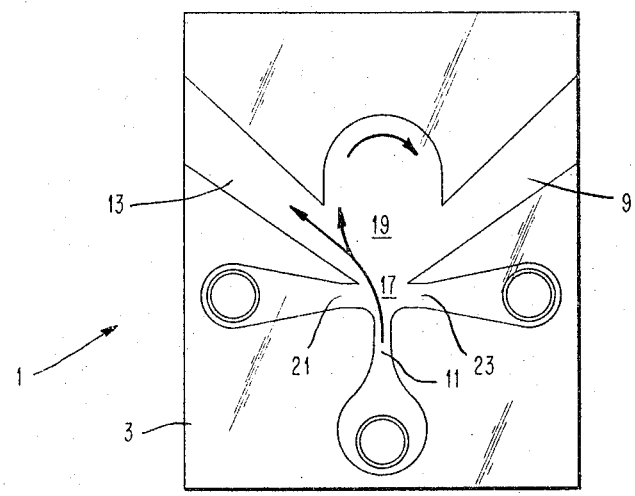
Figure 2:
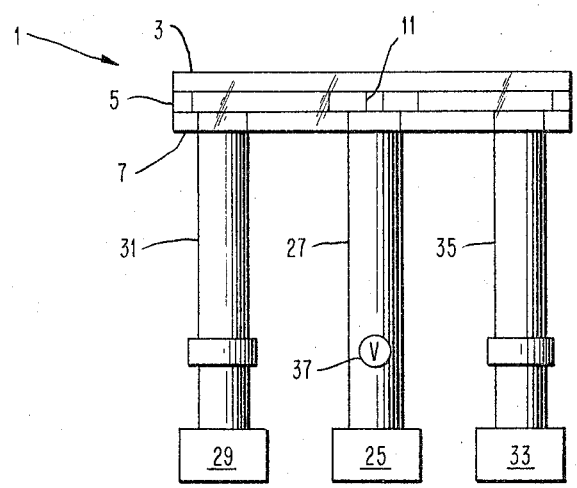

Other objects and advantages of the present invention will be apparent and suggest themselves to those skilled in the art, from a reading of the following specification and claim in conjunction with the accompanying drawing, in which:

FIGURE 1 is a plan view of a fluid device, in accordance with the present invention, and FIGURE 2 is an end view of the device illustrated in FIGURE 1.

Referring to FIGURES 1 and 2 of the drawing, a fluid device 1 comprises three laminae 3, 5 and 7. The lamina 5 includes a cut out configuration 9. Laminae 3, 5 and 7 may be of clear plastic or other suitable elements. They may be cemented or otherwise suitably joined. A single lamina which may be molded may take the place of the three laminae illustrated.

The cut out configuration 9 includes an inlet 11 and a pair of outlets 13 and 15. The inlet 11 and the outlets 13 and 15 all extend from a common mixing chamber 17. A second chamber 19, which may be considered as a vortex chamber, also extends from the mixing chamber 17. A pair of control inlets 21 and 23 extend toward the mixing chamber 17.

The inlet 11 is suitably connected to a source of fluid power 25 by means of a conduit 27. The conduit 27 may extend through a bore in the lamina 7. The fluid from the source 25 is restricted by the narrow orifice of the inlet 11 and enters into the mixing chamber 17 at a relatively high velocity.

The control inlet 21 is suitably connected to a source of control fluid 29 through a suitable conduit 31. Conduit 31 may extend through a bore within the lamina 7. Likewise, the inlet 23 may be connected to a source of control fluid 33 through a conduit 35. Again, the conduit 35 may be connected through a bore in the lamina 7. Fluid from the source 35 may be controlled by a valve 37. The control inlets 21 and 23 provide restricted orifices to narrow the control fluid streams and to increase their velocities and then enter into the mixing chamber 17 from the sources 29 and 33, respectively.

The fluid from the source 25 provides a relatively constant fluid stream at the inlet 11 and may be regulated by a valve 37, if desired.

A control signal originating at one of the sources 29 or 33 may be applied to one of the control inlets 21 or 23, respectively. If a control signal is applied to the inlet 23, the power fluid from the inlet 11 will be directed towards the outlet 13. Likewise, if a control signal is applied to the control inlet 21, the power fluid from the inlet 11 will be directed toward the outlet 15. When the switching starts, a vortex movement of fluid within the chamber 19 starts to build up to assist in the switching operation initially and then to hold the fluid at the switched outlet upon completion of the switching operation.

Assuming that the power fluid from the inlet 11 is directed to the outlet 13, a small portion of the fluid is also directed into the vortex chamber 19. Fluid within the vortex chamber 19 will tend to circulate in a clockwise direction in a manner illustrated by the arrow in FIGURE 1. As the fluid in the vortex chamber 19 circulates and approaches the outlet 13, it tends to hold the fluid which is being directed into the outlet 13. Thus, it is seen that the vortex or circular movement of the fluid within the chamber 19 maintains the original switching action resulting from the application of a control signal to the control inlet 23. Also, at the start of the switching, the vortex action assists in the switching thereby making it possible to provide a very fast switching action. This in contrast to many prior art fluid devices in which the power fluid may be "held up" between outlets for a period of time during the switching operation.

The holding action produced by the vortex action causes the pressure ratio between outlets 13 and 15 to be relatively high. This is a desirable condition in fluid devices since the device tends to become highly stable. Furthermore, with the high ratio between the so-called "on" and the "off" conditions at a pair of outlets, the loading at the "on" outlet becomes less critical. The "on" outlet will tend to maintain its stable condition even when relatively high loads are associated therewith.

If a loading at an "on" outlet is increased and tends to reduce the fluid flow thereat, the tendency is overcome by the vortex action. The reason for this is that the fluid flow will tend to increase in the vortex chamber thereby increasing its holding action in maintaining the power fluid at its switched outlet.

It is noted that the device 1 will maintain its stable state even after the control signal at the control inlet 23 is terminated. If a control signal is subsequently applied to the control inlet 21, the power fluid from the inlet 11 is directed or switched to the outlet 15. Again, a portion of the power fluid from the mixing chamber 17 will also be directed into the vortex chamber 19. A vortex or circular movement of the fluid within the vortex chamber 19 takes place and results in a counter clockwise movement of the fluid therein. The vortex movement of the fluid within the chamber 19 reinforces the fluid at the outlet 15 tending to maintain it in a stable state. The power fluid will be maintained at the outlet 15 even after the control fluid at the control inlet 21 has terminated.

It is noted that, in the present invention, the distance between the inlet 11 and the outlets 13 and 15 is relatively short. This minimizes the loss involved and permits faster operation. In addition, a relatively small vortex chamber 19 is provided. This permits the device 1 to be made relatively compact.

It is noted that the relatively wide angle between the outlets 13 and 15 probably minimizes or nullifies the effects of boundary layer. However, the present invention does not exclude the possibility of the presence of any effect produced by the so-called boundary layer theory to maintain power fluid at a switched outlet. The present invention nevertheless emphasizes the increased holding effect caused by a vortex movement of fluid. Also, the vortex alone is capable of holding power fluid at a switched outlet without depending upon the effects of boundary layer. The boundary layer theory is well known to those skilled in the art of fluid devices.

The fluid involved in the present application may be air or any other suitable gas, and in some cases liquid. Various other modifications may of course be made without departing from the scope of principles of the present invention.

The embodiments of the invention in which an exclusive property or privilege is claimed are defined as follows:

A fluid device comprising an inlet for supplying power fluid, a pair of outlets, a pair of control inlets for directing said power fluid to a selected outlet, and a vortex chamber all leading from a common mixing chamber, said vortex chamber being disposed intermediate said outlets and in alignment with said inlet to receive power fluid therefrom, said vortex chamber being dimensioned to create a vortex movement of fluid therein with a portion of said fluid being directed to said selected outlet to maintain said fluid at said selected outlet after the application of fluid from said control inlets has terminated, said control inlets being disposed at substantially right angles with respect to said inlet and said vortex chamber, said outlets being angularly disposed away from said inlet on opposite sides of said vortex chamber and between said vortex chamber and said control inlets.

References Cited by the Examiner

UNITED STATES PATENTS

| | | | |
|---|---|---|---|
| 1,658,797 | 2/1928 | Charette et al. | |
| 3,158,166 | 11/1964 | Warren | 137—81.5 |
| 3,192,938 | 7/1965 | Bauer | 137—81.5 |

FOREIGN PATENTS 1,278,782   11/1961   France.

OTHER REFERENCES

"Performance Evaluation of a High-Pressure-Recovery Bistable Fluid Amplifier," by W. A. Boothe, Fluid Jet Control Devices; A.S.M.E., Nov. 28, 1962, pages 83–90 (Libr. No. TJ935 S95 1962 C.2).

M. CARY NELSON, *Primary Examiner.*

LAVERNE D. GEIGER, *Examiner.*

S. SCOTT, *Assistant Examiner.*

Notice of Adverse Decision in Interference

In Interference No. 95,915 involving Patent No. 3,270,759, E. R. Phillips, FLUID DEVICE, final judgment adverse to the patentee was rendered Nov. 24, 1969, as to claim 1.

[*Official Gazette July 7, 1970.*]